United States Patent [19]

Peterman, Jr.

[11] 4,077,164
[45] Mar. 7, 1978

[54] DIAMOND GEAR HONE

[75] Inventor: Loyal M. Peterman, Jr., Dublin, Ohio

[73] Assignee: Abrasive Technology, Inc., Columbus, Ohio

[21] Appl. No.: 809,316

[22] Filed: Jun. 23, 1977

[51] Int. Cl.² ............................................. B23F 21/06
[52] U.S. Cl. ................................................ 51/206 P
[58] Field of Search .................. 51/206 P, 287, 26

[56] References Cited

U.S. PATENT DOCUMENTS

| 915,923 | 3/1909 | Zimmerman | 51/206 P |
| 2,977,726 | 4/1961 | Daniel | 51/206 P |
| 3,206,893 | 9/1965 | Rumbaugh | 51/206 P |

FOREIGN PATENT DOCUMENTS

| 864,688 | 4/1961 | United Kingdom | 51/206 P |
| 1,392,704 | 4/1975 | United Kingdom | 51/206 P |

*Primary Examiner*—Gary L. Smith
*Attorney, Agent, or Firm*—Cennamo, Kremblas & Foster

[57] ABSTRACT

A diamond hone for re-working and correcting lead and involute profile of hardened gears which is characterized by a monolayer of diamond abrasive bonded to a gear hone which is provided with a unique geometry wherein the tip and pitch diameter portions are specifically formed to obtain a predetermined deviation from the true involute form conventionally employed. This new diamond hone and unique geometry imparts the desirable final geometry in the re-worked gear.

5 Claims, 5 Drawing Figures

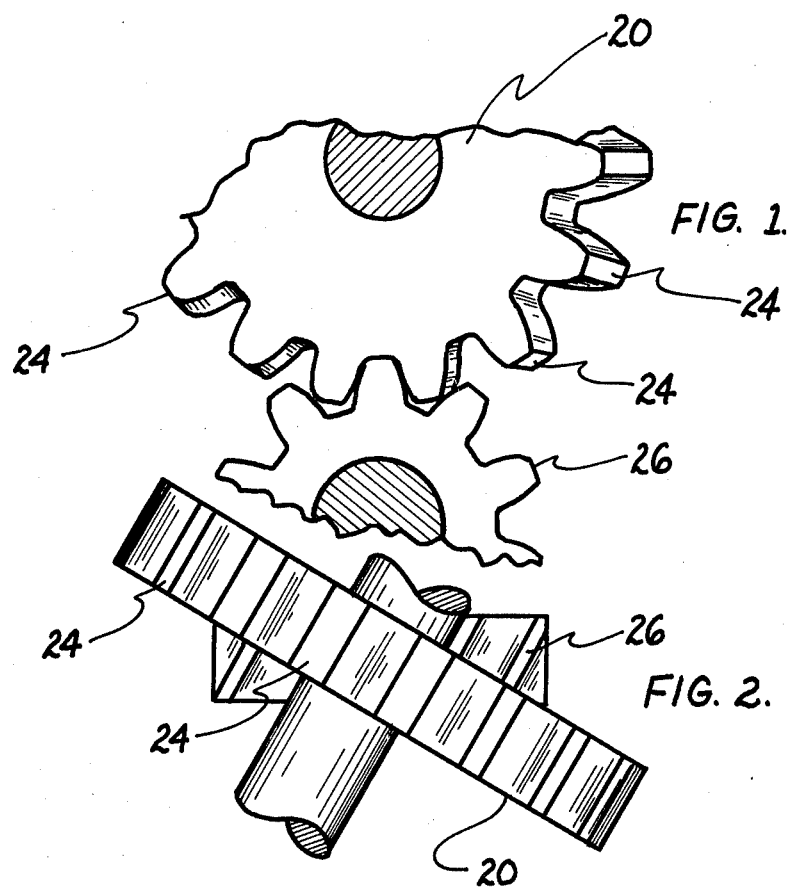
FIG. 1.
FIG. 2.
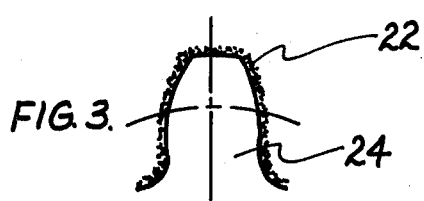
FIG. 3.
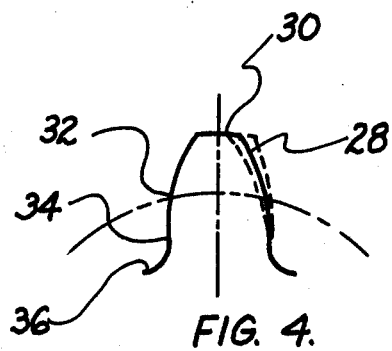
FIG. 4.
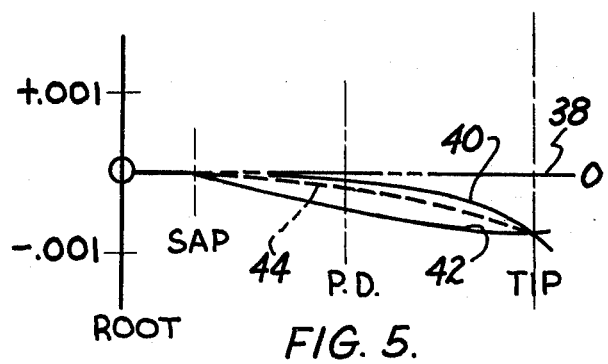
FIG. 5.

DIAMOND GEAR HONE

BACKGROUND

Producing gears with the proper lead angle, profile, concentricity, size and surface finish is a major problem for the gear manufacturing industry. Improper hobbing and/or shaving, improper handling or distortion in heat treating result in poor profile, lead, as well as, nicks and burrs. These imperfections are found in the hardened gears but there has been no truly economical way to re-work the gears to correct for major errors in lead or profile.

Soft plastic hones impregnated with an abrasive and tungsten carbide coated hones were introduced to re-work gears. Speeding, lapping and hand operations for burr and nick removal have been used when required.

The plastic hones, being relatively soft, would follow the form already on the gear, thus giving no correction of lead or profile. The hone did improve the surface finish but would not remove significant amounts of metal. Honing gears with large lead errors or nicks would cause the teeth of the plastic hones to be chipped or broken out. Thus plastic hones are being used primarily as a surface finishing tool.

Tungsten carbide coated hones improved the situation by being able to remove small imperfections but possess such a relatively short useful life that they are rarely employed for significant stock removal which is required in major corrections.

The long established problem of economically correcting significant errors in lead, profile and oversize as compared to the conventional techniques of gear grinding or complete re-work has not been solved prior to the present invention.

Particularly in those gear manufacturing areas which require very high quality and accuracy of gear form, present techniques of correcting lead or profile errors are very expensive processes in hardened gears.

However, the improvement in gear performance, quieter running, and longer life make correction of these errors to a high degree worthwhile, particularly if accomplished in a less expensive manner compared to present techniques.

Gear hones presently used in the industry, can in some instances remove up to 0.002 inches of stock as measured over pins in the gear teeth, however, the material is removed substantially in a uniform manner. Thus if there is a lead or profile error prior to honing, there will be the equivalent error after honing. However, in these prior hones, substantial stock removal requires much greater honing times and greatly increases cost as the hone life per gear worked is dramatically decreased. Therefore, prior type hones are seldom recommended for use in applications requiring significant or major stock removal.

With specific reference to prior attempts to employ mono-layer diamond hones, reference is made to British Patent No. 1,392,704. In this patent, general reference is made to the historical problem of correcting a gear tooth shape and to an unsupported allegation that a diamond hone can accomplish this task, however the detailed specification is devoted to fine surface finishing which is similar to that which is accomplished with the multi-layer plastic hones or tungsten carbide hones.

Further, the recommended sizes of the diamond particles employed for optimum performance are only useful for fine surface finishing and not for any significant removal of metal sufficient to provide shape correction in any practical manner.

Also there is no mention whatever in this patent of the unique geometry of the gear hone teeth as disclosed in the present invention which has been found to be necessary to obtain desirable and commercially acceptable results in the final gear tooth shape.

SUMMARY OF PRESENT INVENTION

The present invention relates generally to gear hones and particularly to a unique gear hone having a monolayer of diamond crystals bonded to a suitable gear blank which has a unique geometry deviation from the true involute form which is unexpectedly necessary to achieve the required desired shape of the finished gear.

In contrast to the modifications of the hone tooth profile required to generate the proper gear tooth form in accordance with the present invention, the lead of the hone tooth is usually straight. Since lead modification capability is built into most honing, shaving, or lapping equipment, no lead modification of the hone itself is usually required.

The diamond gear hone of the present invention is primarily directed to re-working or correcting errors of shape or size in hardened gears apart from merely providing fine surface finishing or removal of relatively minor nicks or burrs. Historically, shape correction has heretofore not been practical in most applications or even possible in many, employing conventional abrasive hones. Such corrections have been accomplished traditionally by grinding one tooth at a time, using expensive equipment and relatively slow production rates to achieve comparable final gear quality.

The gear hone of the present invention is capable of removal of relatively large amounts of stock and achieves the desired final gear tooth shape and further may be employed using existing conventional honing, shaving, or lapping equipment at relatively high production rates.

Possible operations performed using the gear hones of the present invention include size reduction, correction or modification of involute profile and lead, and correction of out of round conditions heretofore not feasible using prior type abrasive hones. The exceptional durability and stock removal potential of the hone of the present invention lead to a possibility of eliminating the gear shaving step before heat treatment as presently employed and substituting the diamond hone after heat treatment for final correction of shape.

OBJECTS

It is a primary object of the present invention to provide a novel monolayer diamond type of gear hone which is capable of performing gear tooth shape corrections at drammatically reduced costs compared to prior methods and means.

It is another object of the present invention to provide a gear hone of the type described which has a relatively long life which permits major stock removal to be accomplished at economical cost for a gear quality approaching that of ground gears.

It is another object of the present invention to provide a gear hone of the type described wherein the unique modified involute geometry of the hone produces the desired correction and final gear tooth shape.

It is a further object of the present invention to provide a gear hone of the type described which possesses the durability and stock removal potential to eliminate the necessity of the step of shaving as presently practiced in the manufacture of gears.

Other objects and features of the invention will be apparent from the following specification and claims when considered in connection with the accompanying drawings illustrating the preferred embodiments of the invention.

BRIEF DESCRIPTION OF THE DRAWINGS

FIG. 1 is a perspective view showing the present invention in use;

FIG. 2 is a side view of FIG. 1;

FIG. 3 is a view of one of the abrasive coated gear teeth;

FIG. 4 shows the profile of the tool tooth of the present invention; and

FIG. 5 shows a graph depicting the variation in profile of the tooth of the present invention from the ideal profile.

DESCRIPTION OF THE PREFERRED EMBODIMENT

Referring in detail to the drawings, a portion of a gear hone tool constructed in accordance with the present invention is illustrated in FIG. 1 and includes a steel gear-like blank 20 provided with a bonded monolayer of diamond crystals 22. Preferably, the diamond abrasive layer 22 is bonded to the blank 20 by utilizing a metal alloy bonding process such as disclosed in U.S. Pat. No. 3,894,673, to ensure a strong, durable bond and provide maximum abrasive utility. However, other forms of bonding may be employed which result in comparable bond strength without departing from the spirit of the present invention.

The gear blank employed in the present invention is basically similar to the mating gear of the gear being worked upon except the thickness of each tooth 24 is reduced by the thickness of the bonded diamond layer 22 on each side of the tooth as seen in FIG. 3.

As seen in FIG. 2, the gear hone 20 is preferably meshed, as in the gear shaving process, with the work gear 26 in crossed-axis relationship and rotated in both directions under controlled tight-meshed conditions. However, the zero-backlash method may be employed depending upon the desired results of a given application.

Typically in the crossed-axis method using the gear hones of the present invention, the difference in the helical angle between the hone and work piece is preferably between 8 to 12 degrees for optimum results. However, greater and lesser angular differentials commonly employed in the crossed-axis method will also work using the tool of the present invention.

Referring now to FIG. 4, a gear hone tooth is diagrammatically illustrated. The solid line profile 28 represents the true involute form. The broken lines represent negative and positive deviations. The tip portion is indicated at 30, the pitch diameter is indicated at 32, the start of active profile and the root are indicated at 34 and 36 respectively.

Referring now to FIG. 5, the profile of a single gear tooth is shown graphically to illustrate the unique geometry of the present invention. The horizontal line 38 corresponds to the true involute profile of a typical gear tooth as shown in FIG. 4. Deviations from this true involute form are either plus or minus and generally do not exceed 1 to 2 thousandths of an inch. It is known that an ideal gear tooth profile is similar to that represented by line 40 in FIG. 5. Such a profile is negative at the tip, with respect to line 38, and crowned at the pitch diameter, with respect to line 44. Line 44 represents a linear negative deviation from the true involute profile. This profile in the gear tooth represented by line 40 results in a major load distribution between meshing gears at the pitch diameter, thereby minimizing breakage, reducing noise and wear and extending gear life.

To generate this desirable gear profile with the diamond hone of the present invention, it has been discovered that the hone should have a profile as illustrated in FIG. 5 by line 42. That is, the tip of the hone tooth should be minus, relative to 38 by an amount desired for the same deviation in the gear tooth and the flank of the tooth in the vincinity of the pitch diameter should be minus (relative to line 44) by a like amount to the desired positive deviation relative to line 44, in the gear tooth. Thus the hone must have a minus tip to impart a minus tip in the gear profile and a "hollow" configuration at the pitch diameter to impart a crowned configuration in the gear at the pitch diameter as related to a linear deviation represented by line 44. This configuration is contrasted from prior teachings wherein the gear hones have been made with the true involute profile desired in the gear being worked.

It has been discovered that when the gear hone of the present invention is provided with the geometrical deviation from the true involute profile as described herein in order to assure that the initial gear being honed will be provided with a minus tip and a slight crown at the pitch diameter within acceptable predetermined limits, a further advantage is realized.

As the hone wears, subsequent gear profiles will approach the true involute form and therefore a longer useful life of the hone is achieved. It is recognized in the art that a true involute profile to a slightly minus tip and slight crown at the pitch diameter is the desirable geometry of the finished gear for smooth operation. The hone of the present invention produces this desirable range in the worked gear and does so over a drammatically extended lifespan compared to prior hones.

Further, those gears which heretofore could not be conventionally ground by any means such as spiroids, hypoids, bevel gears or gear clusters and internal gears can be honed using the teachings of the present invention to achieve economical shape correction.

Lead errors up to 0.004 inches on the flank of a tooth and most profile error up to 0.001 inches, as well as size corrections up to 0.010 over pins can be achieved using the tool of the present invention.

This magnitude of shape correction is impossible to achieve, or for most applications totally economically impractical, utilizing conventional plastic or tungsten carbide hones. In most instances, these conventional honing tools simply do not have a sufficient lifespan to justify their use even for shape correction in the lower range of the relatively heavy or substantial stock removal necessary to correct shape as contrasted to minor stock removal involved in fine finishing of the gear surface. Further, the wear on these conventional honing tools is so rapid that accurate hone geometry is, from piece to piece, almost impossible to maintain within dimensional limits effective to control modification of gear profile.

On the contrary, the diamond hones of the present invention maintains a drammatically longer useful life span and wear is slow enough to permit the initial geometry of the hone teeth to be determinative of the final results obtained on the gear.

Since wear of the hone will occur somewhat faster at the pitch diameter relative to the tip, a slight positive deviation may appear at this point in the gear tooth which is acceptable within the given tolerance ranges. However, at this same time the tip of the hone tooth will still permit a slightly minus to a true involute profile at the tip portion of the gear tooth. As pointed out earlier herein, a positive deviation on the gear tooth tip is totally unacceptable as is a hollow profile at the pitch diameter.

As wear on the hones reaches the point that a positive tip deviation is being produced on the gear, the hone's usefulness is ended and must be replaced. However, a hone constructed in accordance with the present invention has shown a lifespan up to 30 or more times greater than tungsten carbide hones in comparable applications and will perform operations heretofore impossible to impractical at best.

I claim:

1. In a gear honing tool the combination of a gear-like blank member provided with a plurality of teeth generally adapted to mesh with the teeth of the gear being worked and a monolayer of diamond crystals bonded to the hone teeth to form an abrasive surface, each of said hone teeth carrying said layer of diamond crystals having a predetermined profile configuration having a negative deviation from the true involute form defining a relatively smooth curve having a substantially concave shape.

2. The tool defined in claim 1 wherein said tip portion is negative relative to the true involute shape.

3. The tool defined in claim 1 wherein said profile deviation defines a relatively smooth curve from the start of the active profile to the tip of the hone tooth with the greatest negative deviation occurring at approximately the pitch diameter.

4. The hone defined in claim 1 wherein the negative deviation at the pitch diameter ranges from approximately 0.0005 to 0.002 inches.

5. The tool defined in claim 1 wherein said tool includes diamond crystal sizes ranging from approximately 100 to 400 mesh.

* * * * *